(12) United States Patent
Zhang et al.

(10) Patent No.: US 8,358,668 B2
(45) Date of Patent: Jan. 22, 2013

(54) PHYSICAL LAYER FRAME FORMAT DESIGN FOR WIDEBAND WIRELESS COMMUNICATIONS SYSTEMS

(75) Inventors: Hongyuan Zhang, Sunnyvale, CA (US); Rohit U. Nabar, Sunnyvale, CA (US); Arul Durai Murugan Palanivelu, Sunnyvale, CA (US); Hui-Ling Lou, Sunnyvale, CA (US); Songping Wu, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 624 days.

(21) Appl. No.: 12/410,883

(22) Filed: Mar. 25, 2009

(65) Prior Publication Data

US 2009/0252104 A1 Oct. 8, 2009

Related U.S. Application Data

(60) Provisional application No. 61/043,384, filed on Apr. 8, 2008, provisional application No. 61/044,816, filed on Apr. 14, 2008, provisional application No. 61/076,453, filed on Jun. 27, 2008.

(51) Int. Cl.
*H04J 3/16* (2006.01)
(52) U.S. Cl. ........ 370/470; 370/371; 370/203; 370/252; 370/392
(58) Field of Classification Search .......... None
See application file for complete search history.

(56) References Cited

U.S. PATENT DOCUMENTS 6,754,195 B2 * 6/2004 Webster et al. ............... 370/335
2003/0058952 A1 3/2003 Webster
2007/0168841 A1 * 7/2007 Lakkis ............................ 714/781
2008/0247494 A1 * 10/2008 Halford et al. ................ 375/343
2009/0154575 A1 6/2009 Rofougaran
2009/0217334 A1 * 8/2009 Nee ................................ 725/111

FOREIGN PATENT DOCUMENTS

JP 2004-537892 12/2004
JP 2005-521270 7/2005

(Continued)

OTHER PUBLICATIONS

LAN/MAN Standards Committee of the IEEE Computer Society, Draft Supplement to Standard [for] Information Technology, Apr. 2003, IEEE P802.11g/D8.2, Institute of Electrical and Electronics Engineers, Inc., New York, New York.

(Continued)

*Primary Examiner* — Kibrom T Hailu

(57) ABSTRACT

Systems and methods are provided for processing a payload portion of a received signal in a single carrier mode or a multiple carrier mode using a wireless channel receiver based on a portion of the received signal, where a signaling portion of the received signal is a single carrier signal. A single carrier signaling portion is received, and whether the payload portion of the signal is a single carrier signal or a multiple carrier signal is detected from the received single carrier signaling portion. The payload portion of the received signal is demodulated in a single carrier mode if the detecting determines that the payload portion of the received signal is a single carrier signal, and the payload portion of the received signal is demodulated in a multiple carrier mode if the detecting determines that the payload portion of the received signal is a multiple carrier signal. Data from the demodulated payload portion of the received signal is stored in a computer-readable memory.

12 Claims, 14 Drawing Sheets

FOREIGN PATENT DOCUMENTS

| WO | 03/005652 A1 | 1/2003 |
|---|---|---|
| WO | 03/005740 A2 | 1/2003 |
| WO | 03005740 A2 | 1/2003 |
| WO | 2006/101489 A1 | 9/2006 |

OTHER PUBLICATIONS

Mujtaba, Syed Aon, TGn Sync Proposal Technical Specification, May 18, 2005, IEEE 802.11-04/0889r6, Institute of Electrical and Electronics Engineers, Inc.

LAN/MAN Standards Committee of the IEEE Computer Society, Part 15.3: Wireless Medium Access Control (MAC) and Physical Layer (PHY) Specifications for High Rate Wireless Personal Area Networks (WPANs), 2009, IEEE P802.15.3c/D07, Institute of Electrical and Electronics Engineers, Inc., New York, New York.

International Search Report and Opinion issued in connection with PCT/US2009/048245 and dated Dec. 4, 2009.

International Search Report and Opinion issued in connection with PCT/US2009/038222 and dated Jul. 22, 2009.

Office Action, U.S. Appl. No. 12/489,865, dated Dec. 2, 2011.

EPO: Summons to attend oral proceedings pursuant to Rule 115(1) EPC issued for EP Application No. 09789891.0 on Oct. 8, 2012 (6 pages).

"Encapsulation (networking)", May 13, 2008, XP055037847 (2 pages), Retrieved from the Internet: URL:http://en.wikipedia.org/w/index.php?title=Encapsulation_(networking)&oldid=212048728 [retrieved on Sep. 11, 2012].

JPO: Non Final Notice of Reasons for Rejection for Japanese Patent Application No: 2011-517458 dated Sep. 11, 2012 (2 pages).

Summary (in English) of JPO's Non Final Notice of Reasons for Rejection dated Sep. 11, 2012 (3 pages).

\* cited by examiner

PHYSICAL LAYER FRAME FORMAT DESIGN FOR WIDEBAND WIRELESS COMMUNICATIONS SYSTEMS

CROSS-REFERENCE TO RELATED APPLICATIONS

This application claims priority from U.S. Provisional Patent Application No. 61/043,384, filed on Apr. 8, 2008, and entitled "Physical Layer Frame Format Design for Wideband Wireless Communications Systems", U.S. Provisional Patent Application No. 61/044,816, filed Apr. 14, 2008, and entitled "Physical Layer Frame Format Design for Wideband Wireless Communications Systems", and U.S. Provisional Patent Application No. 61/076,453, filed Jun. 27, 2008, and entitled "Physical Layer Frame Format Design for Wideband Wireless Communications Systems". The entirety of these disclosures is incorporated herein by reference.

FIELD

The technology described in this patent document relates generally to wideband wireless communications, and more particularly to physical layer frame formats.

BACKGROUND

Continued advances in computer technology increase interest in and demand for high data rate (e.g., >1 Gbps) wireless communication. These high data rate communications are often realized through the use of wide bandwidths. For example, Gbps data rates are often accomplished using several hundred MHz or several GHz of bandwidth. These large bandwidths are available around higher carrier frequencies such as the unlicensed 60 GHz band. FIG. 1 depicts an example 60 GHz frequency channel plan 30. The plan offers four channels 32 of about 2 GHz each centered near 60 GHz. While wide bandwidth channels offer opportunities for large data rates, they are often vulnerable to delay dispersion (delay spread) even at low range (e.g., less than 10 meters).

There are a wide variety of applications that can take advantage of wireless communications. Two pervasive applications are high data rate at large range applications and low/moderate data rate at short range applications. These applications have their own advantages and disadvantages.

In a high data rate at large range application, high data rates are achieved, but the system may have to tolerate a high delay spread. High delay spreads increase complexity and power requirements in transmitters and receivers. The higher complexity circuitry tends to have larger space requirements than short range devices, and the higher power needs are more suited for electrical plug-in devices as opposed to battery devices. In contrast, low/moderate data rate applications at a short range may be line-of-sight applications having a short delay dispersion and lower power requirements. These applications may be realized more easily in lower complexity handheld portable wireless systems that are often sensitive to power consumption.

FIGS. 2A and 2B depict block diagrams of a single carrier transmitter 40 and a single carrier receiver 50, respectively. In FIG. 2A, an encoder 42 receives input data 44 and encodes the data for transmission. The output of the encoder 42 is propagated to a single carrier modulator 46 that integrates the encoded data onto a single carrier for transmission over an antenna 48. In FIG. 2B, the receiver 50 receives single carrier wireless signals via an antenna 52 and propagates the received signals to a single carrier demodulator 54. The single carrier demodulator 54 extracts data from the received single carrier signal and passes the extracted data to a decoder 56. The decoder 56 decodes the extracted data and makes the decoded data 58 available to downstream circuitry.

FIGS. 3A and 3B depict block diagrams of a multiple carrier transmitter 60 and a multiple carrier receiver 70, respectively. In FIG. 3A, an encoder 62 receives input data 64 and encodes the data for transmission. The output of the encoder 62 is propagated to a multiple carrier modulator 66 that integrates the encoded data onto multiple carriers for transmission over an antenna 68. In FIG. 3B, the receiver 70 receives multiple carrier wireless signals via an antenna 72 and propagates the received signals to a multiple carrier demodulator 74. The multiple carrier demodulator 74 extracts data from the received multiple carrier signals and passes the extracted data to a decoder 76. The decoder 76 decodes the extracted data and makes the decoded data 78 available to downstream circuitry.

Data modulation schemes tend to be more compatible with some applications than others. For example, orthogonal frequency-division multiplexing (OFDM) is a multiple carrier multiplexing scheme that is suitable for sustaining high data rates in channels having a large delay due to the ease of frequency domain channel equalization. This makes OFDM compatible with the high data rate at large range application described above, as OFDM offers relatively simple equalization in a high delay spread channel, supports a longer range, and supports needed high data rates.

OFDM disadvantages, however, include a relatively high hardware complexity and low power efficiencies. In a wideband system having a high carrier frequency, such as 60 GHz, power amplifier (PA) efficiency at the transmitter, and analog-to-digital converter (ADC) bit-width at the receiver are engineering design challenges. Additionally, OFDM introduces high peak-to-average-ratio (PAPR) in the transmitted and received signal waveforms, requiring large headroom for the operating point at the power amplifier and analog-to-digital converter, which may reduce power amplifier efficiency and increase the complexity of analog-to-digital converter design.

It should be noted that the terms multiple carrier (MC) and OFDM modulation will be discussed throughout this disclosure and are in most cases interchangeable. Thus, where OFDM is referenced, other multiple carrier modulation techniques may be used. Similarly, references to multiple carrier modulations include OFDM implementations.

FIGS. 4A and 4B depict block diagrams of an OFDM transmitter 80 and an OFDM receiver 90, respectively. In FIG. 4A, an encoder 82 receives input data 84 and encodes the data for transmission. The output of the encoder 82 is propagated to an OFDM modulator 86 that integrates the encoded data onto multiple carriers for transmission over an antenna 88. In FIG. 4B, the receiver 90 receives OFDM wireless signals via an antenna 92 and propagates the received signals to an OFDM demodulator 94. The MC demodulator 94 extracts data from the received OFDM signal and passes the extracted data to a decoder 96. The decoder 96 decodes the extracted data and makes the decoded data 98 available to downstream circuitry.

In line of sight channels or other applications requiring lower data rates, a single carrier (SC) modulation with a time-domain equalizer is often sufficient. A single carrier system may offer simplicity in hardware combined with low power requirements and high transmit power efficiency. Single carrier modulation may present a constant envelope and/or low peak-to-average ratio easing power amplifier and analog-to-digital converter design. However, single carrier systems typically require complicated equalizers for high delay spread channels, effectively limiting the range for high data rate transfers.

SUMMARY

In accordance with the teachings provided herein, systems and methods are provided for processing a payload portion of a received signal in a single carrier mode or a multiple carrier mode using a wireless channel receiver based on a portion of the received signal, where a signaling portion of the received signal is a single carrier signal and the payload portion of the received signal is a single carrier signal or a multiple carrier signal. The system may include receiving the single carrier signaling portion of the received signal and detecting from the single carrier signaling portion of the received signal whether the payload portion of the received signal is a single carrier signal or a multiple carrier signal. The system may then demodulate the payload portion of the received signal in a single carrier mode if the detecting step determines that the payload portion of the received signal is a single carrier signal. The system may demodulate the payload portion of the received signal in a multiple carrier mode if the detecting step determines that the payload portion of the received signal is a multiple carrier signal. The method may store data from the demodulated payload portion of the received signal in a computer-readable memory.

The detecting step may determine that the payload portion of the received signal will be a single carrier signal when the signaling portion or the frame delimiter portion of the received signal contains a first cover sequence, and the detecting step may determine that the payload portion of the received signal will be a multiple carrier signal when the signaling portion or the frame delimiter portion of the received signal contains a second cover sequence. The detecting step may determine that the payload portion of the received signal will be a single carrier signal when the signaling portion or the channel estimation portion of the received signal contains a first spreading sequence, and the detecting step may determine that the payload portion of the received signal will be a multiple carrier signal when the signaling portion or the channel estimation portion of the received signal contains a second spreading sequence.

The received signaling portion of the received signal may be part of a received single carrier preamble, where the received single carrier preamble further includes a frame delimiter sequence (SFD) that us utilized by the receiver to establish frame timing and may contain a single carrier channel estimation sequence (CES) that is utilized by the receiver for channel estimation. A cover sequence in SFD or spreading sequence in CES may also be used to signal a single carrier or multiple carrier payload. The receiver may perform channel estimation for both the single carrier mode and the multiple carrier mode based on the single carrier channel estimation sequence. The channel estimation for the multiple carrier mode may be performed by sampling the single carrier channel estimation sequence at a multiple channel mode sampling rate and performing a fast-Fourier transform on the detected samples.

The payload portion of the multiple carrier signal may begin with a multiple carrier channel estimation sequence, where the step of demodulating the payload portion of the received signal in a multiple carrier mode may include performing channel estimation for the multiple carrier mode based on the multiple carrier channel estimation sequence. The received signaling portion for the received signal may be part of a received single carrier preamble, and the single carrier preamble may not include a single carrier channel estimation sequence.

The receiver may perform channel estimation for the multiple carrier mode based in part on the single carrier channel estimation signal, where a first estimation for the multiple carrier mode is performed by sampling the single carrier channel estimation sequence at a multiple channel mode sampling rate and performing a fast-Fourier transform on the detected samples. The payload portion of the multiple carrier signal may begin with a multiple carrier channel estimation sequence, where the step of demodulating the payload portion of the received signal in a multiple carrier mode includes performing a second channel estimation for the multiple carrier mode based on the multiple carrier channel estimation sequence. A final channel estimation may be calculated based on the first channel estimation and the second channel estimation.

The signaling portion of the received signal may include a common single carrier header portion of the received signal, where the common single carrier header portion of the received signal contains physical layer demodulation/decoding information that includes packet length and pilot insertion information. The common single carrier header portion may contain all of the information needed for the receiver to perform single carrier or multiple carrier demodulation/decoding.

The detecting step may further include sampling the signaling portion of the received signal at a first rate derived from a baseband clock, and the step of demodulating the payload portion of the received signal in a multiple carrier mode may further include sampling the payload portion of the received signal at a second rate derived from the baseband clock, where the signaling portion of the received signal and the payload portion of the received signal contain the same carrier frequency. The first rate and the second rate may be the same. The method may further include performing channel estimation for the multiple carrier mode using only signals of the received single carrier signaling portion, where the received single carrier signaling portion and the received payload portion in a multiple carrier mode were transmitted using a same digital filter. The first rate may be about 1.728 GHz, and the second rate may be about 2.592 GHz.

The signaling portion of the received signal may include a common single carrier header portion, where the common single carrier header portion concludes with one or more single carrier conclusion signals that are known to the receiver. The payload portion may begin with one or more multiple carrier start signals that are known to the receiver. The step of demodulating the payload portion of the received signal in a multiple carrier mode may further include receiving the multiple carrier payload portion of the received signal that is transmitted with the same power as the single carrier signaling portion of the received signal.

The detecting step may further include sampling the signaling portion of the received signal at a first rate derived from a baseband clock, where the step of demodulating the payload portion of the received signal in a multiple carrier mode further includes sampling the payload portion of the received signal at a second rate derived from the baseband clock. The second rate may be 1.5 times as fast as the first rate, and the first rate and the second rate may be aligned such that a first sample at the first rate coincides with a first sample at the second rate, and a third sample at the first rate coincides with a fourth sample at the second rate.

The detecting step may further include sampling the signaling portion of the received signal at a first rate derived from a baseband clock, where the step of demodulating the payload portion of the received signal in a multiple carrier mode further includes sampling the payload portion of the received signal at a second rate derived from the baseband clock. The second rate may be 2 times as fast as the first rate, and the first rate and the second rate may be aligned such that a first sample at the first rate coincides with a first sample at the second rate, and a second sample at the first rate coincides with a third sample at the second rate.

The payload portion of the received signal in a single carrier mode may be received at the same data rate as the signaling portion of the received signal. The receiver may perform carrier sensing, AGC/ADC setting, carrier frequency offset detection, and timing reference detection using the received single carrier signaling portion of the received signal for both the single carrier mode and the multiple carrier mode.

The received signaling portion of the received signal may be part of a single carrier preamble, where the received single carrier preamble is immediately followed by a multiple carrier channel estimation sequence, where the multiple channel estimation sequence is followed by a multiple carrier channel header. The multiple carrier channel header may be followed by the multiple carrier payload portion. The multiple carrier signal may be an OFDM signal. The received signal may comply with a standard selected from the group consisting of 802.15.3c, 802.11g, and 802.11n.

As another example, a processor-implemented method of processing a channel time allocation portion of a received signal in a single carrier mode or a multiple carrier mode using a wireless channel receiver based on a portion of the received signal, where a signaling portion of the received signal is a single carrier signal and the channel time allocation portion of the received signal is a single carrier signal or a multiple carrier signal may include receiving the single carrier signaling portion of the received signal, and detecting from the single carrier signaling portion of the received signal whether the channel time allocation portion of the received signal is a single carrier signal or a multiple carrier signal. The channel time allocation portion of the received signal may be demodulated in a single carrier mode if the detecting step determines that the channel time allocation portion of the received signal is a single carrier signal. The channel time allocation portion of the received signal may be demodulated in a multiple carrier mode if the detecting step determines that the channel time allocation portion of the received signal is a multiple carrier signal. Data from the demodulated channel time allocation portion of the received signal may be stored in a computer-readable memory.

The signaling portion of the received signal may be received at a first data rate, where the received channel time allocation portion of the received signal in the multiple carrier mode is received at a second data rate that is faster than the first data rate, where the received channel time allocation portion of the received signal in the single carrier mode is received at the first data rate. The signaling portion of the received signal may include a beacon portion and a contention access portion, where receiving the signaling portion of the received signal as a single carrier signal prevents collisions by devices that do not support the multiple carrier mode because the devices that do not support the multiple carrier mode recognize the signaling portion of the received signal.

As a further example, a wireless channel receiver configured to process a payload portion of a received signal in a single carrier mode or a multiple carrier mode based on a portion of the received signal, where a signaling portion of the received signal is a single carrier signal and the payload portion of the received signal is a single carrier signal or a multiple carrier signal may include an antenna, and a single carrier receiver configured to receive the single carrier signaling portion of the received signal from the antenna. The receiver may include a mode detector configured to determine whether the payload portion of the received signal is a single carrier signal or a multiple carrier signal based on the single carrier signaling portion of the received signal. The receiver may further include a demodulator configured to receive the payload portion of the received signal from the antenna and demodulate the payload portion of the received signal in a single carrier mode if the mode detector determines that the payload portion of the received signal is a single carrier signal and to demodulate the payload portion of the received signal in a multiple carrier mode if the mode detector determines that the payload portion of the received signal is a multiple carrier signal. The receiver may further include a computer-readable memory configured to store data from the demodulated signal from the demodulator.

As another example, a transmitter for transmitting a single carrier payload or a multiple carrier payload may include an antenna and a single carrier modulator configured to transmit a single carrier signaling portion of a signal. The transmitter may further include selection logic configured to select between a single carrier mode and a multiple carrier mode. A multiple carrier modulator may be configured to transmit the multiple carrier payload following the transmission of the single carrier signaling portion of the signal when the selection logic selects the multiple carrier mode. The single carrier modulator may be further configured to transmit the single carrier payload following transmission of the single carrier signaling portion of the signal when the selection logic selects the single carrier mode.

As a further example, a method for transmitting a payload portion of a signal in a single carrier mode or a multiple carrier mode may include transmitting a single carrier signaling portion of the signal and determining whether to send the payload portion of the signal in a single carrier mode or a multiple carrier mode. The payload portion of the signal may be transmitted over multiple carriers if the multiple carrier mode is selected by the determining step, and the payload portion of the signal may be transmitted over a single carrier if the single carrier mode is selected by the determining step.

DETAILED DESCRIPTION

Based on the application, at least three types of wideband devices may be present in a wireless network: 1.) SC-Only devices such as simple handheld, low-range, low-power devices; 2.) MC-Only devices that target longer range and higher data rates that are not as sensitive to power and complexity as SC-Only devices; and 3.) Dual-Mode devices that take advantage of both single carrier modulation and multiple carrier modulation that may control or talk with both single carrier and multiple carrier devices. Co-existence between these various types of devices may be problematic, especially if the devices cannot communicate to each other—e.g., SC-Only devices may not be able to communicate with MC-Only devices.

To alleviate these communications issues, a common preamble/header frame format may be used for the physical layer that may be utilized by all three types of devices. Using this common format, any device may understand the preamble/header of any packet. This enables network traffic to be well-controlled without transmission conflicts. Hardware complexity may also be reduced because any device (including the dual mode device) need only implement one single carrier sense, synchronization, header decoding, or channel estimation mechanism at its receiver. The common preamble and header is included in transmissions of both single carrier modulated packets and multiple carrier modulated packets. The common preamble and header is transmitted in a single carrier mode such that all three of the above described wideband devices may interpret the preamble and header, and all devices in the network are designed such that all devices can understand the single carrier common preamble and header.

Figure 2A:
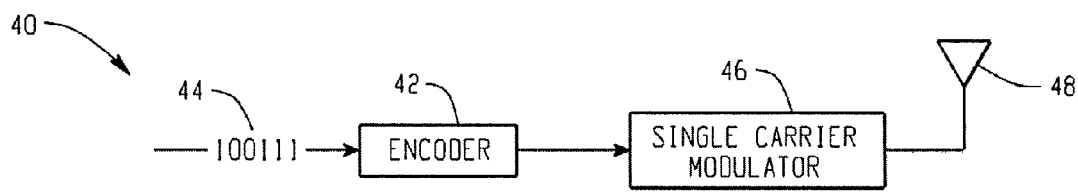
FIGS. 2A and 2B depict block diagrams of a single carrier transmitter and a single carrier receiver.
Figure 5A:
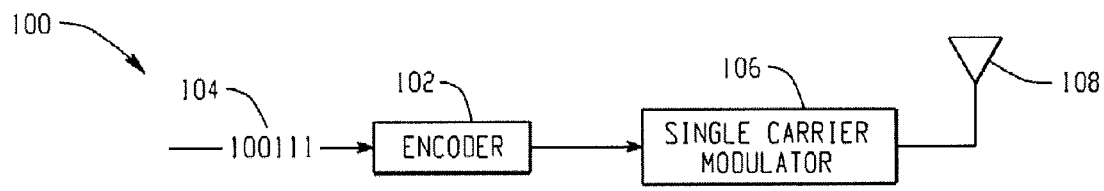
FIGS. 5A and 5B depict block diagrams of a single carrier transmitter and a dual mode transmitter.
Figure 5B:
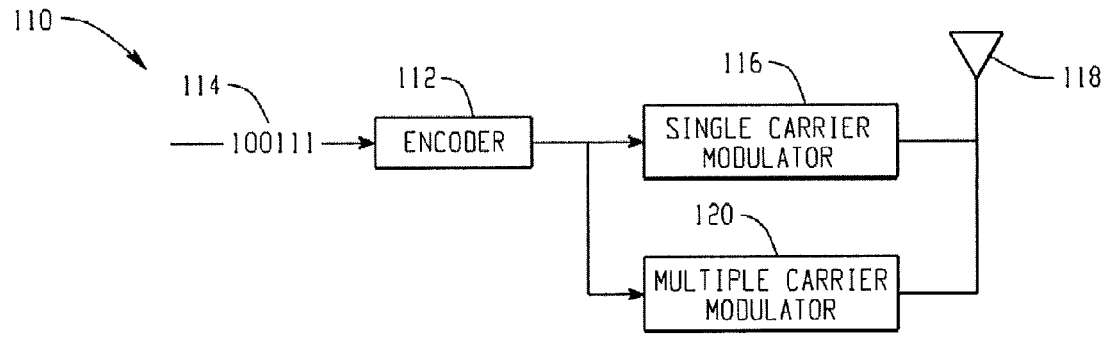

FIGS. 5A and 5B depict block diagrams of a single carrier transmitter 100 and a dual mode transmitter 110 for transmitting packets according to the above described format The single carrier transmitter 100 of FIG. 5A includes an encoder 102 that receives data 104 that encodes the data for transmission. A single carrier modulator 106 receives the output of the encoder 102 and modulates the encoded data onto a single carrier. The modulated signal is then transmitted via an antenna 108. The single carrier transmitter 100 of FIG. 5A is able to send SC packets according to the common preamble/header frame format utilizing the same hardware as the SC-Only transmitter described with reference to FIG. 2A. The single carrier transmitter 100 transmits the common preamble/header via the antenna 108 and follows the common preamble/header with a single carrier payload containing the encoded data.

FIG. 5B depicts a dual-mode transmitter 110 for transmitting packets according to the above described format. The dual-mode transmitter 110 is capable of transmitting both single carrier signals and multiple carrier signals, such as OFDM modulated signals, according to the common preamble/header format. The dual-mode transmitter 110 includes an encoder 112 that receives and encodes data 114 for transmission. In both the single carrier mode and multiple carrier mode, the common preamble/header is modulated utilizing a single carrier modulator 116 and transmitted via the antenna 118. In a single carrier mode, encoded payload data from the encoder 112 is modulated using the single carrier modulator 116 and transmitted via the antenna 118 following transmission of the common preamble/header. In a multiple carrier mode, the common preamble/header is modulated by the single carrier modulator 116 and transmitted via the antenna 118 in a similar fashion as in the single carrier mode. However, in the multiple carrier mode, the encoded payload data is modulated by the multiple carrier modulator 120 and transmitted via the antenna 118 following transmission of the single carrier common preamble/header.

Figure 2B:
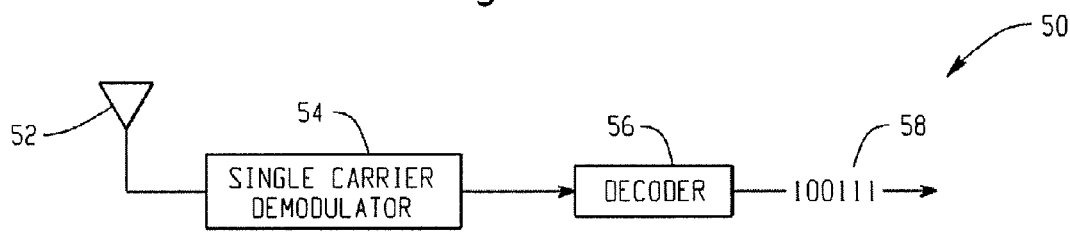
Figure 3A:
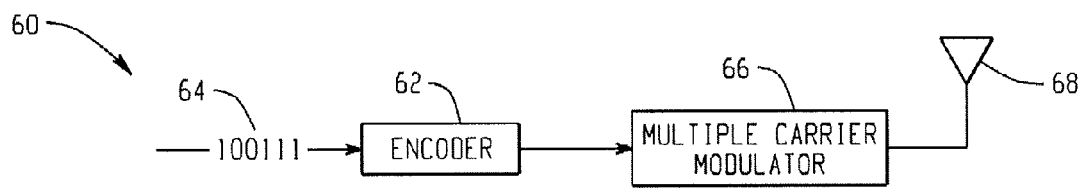
FIGS. 3A and 3B depict block diagrams of a multiple carrier transmitter and a multiple carrier receiver.
Figure 3B:
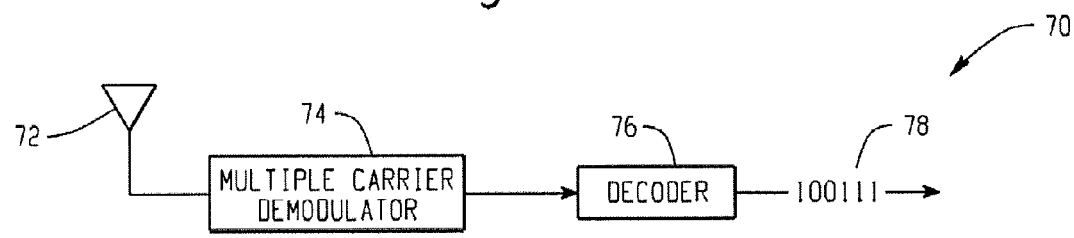
Figure 4A:
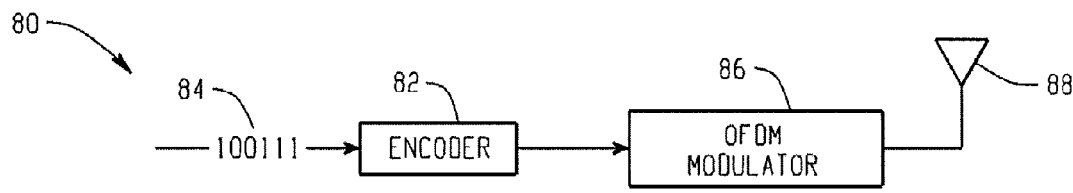
FIGS. 4A and 4B depict block diagrams of an OFDM multiple carrier transmitter and an OFDM multiple carrier receiver.
Figure 4B:
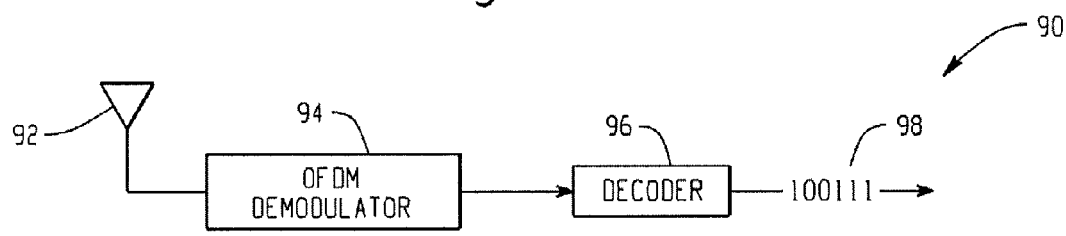
Figure 6A:
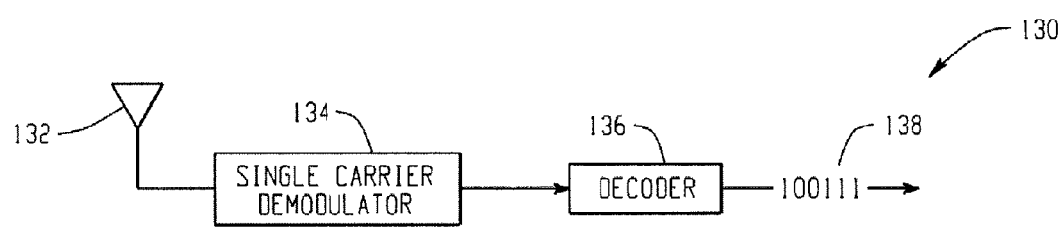
FIGS. 6A and 6B depict block diagrams of a single carrier receiver and a multiple carrier receiver that includes a packet synchronizer/header decoder.
Figure 6B:
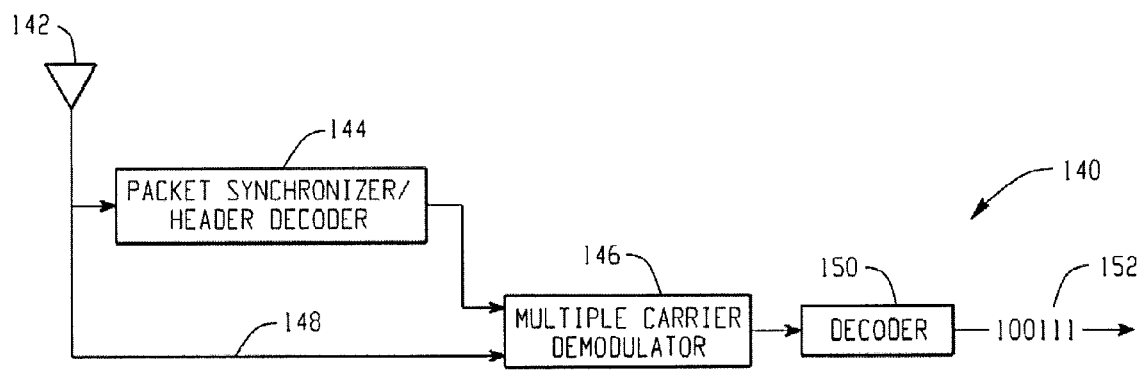

FIGS. 6A and 6B respectively depict block diagrams of a single carrier receiver 130 and a multiple carrier receiver 140 that includes a packet synchronizer/header decoder. Both of the depicted receivers are capable of understanding the single carrier common preamble/header. The receiver 130 of FIG. 6A is an SC-Only receiver similar to the receiver described with reference to FIG. 2B. The SC-Only receiver 130 receives the single carrier common preamble/header via an antenna 132 which propagates the common preamble/header to a single carrier demodulator 134 which processes the common preamble/header. The common preamble/header identifies whether the following payload portion of the packet is a single carrier signal or multiple carrier signal. If the common preamble/header identifies a single carrier payload, the single carrier demodulator 134 receives the payload via the antenna 132, demodulates the payload, and passes the demodulated payload to the decoder 136, which decodes the data 138 and makes it available to downstream circuitry. If the common preamble/header identifies a multiple carrier payload, the payload is ignored because the single carrier receiver 130 cannot process the multiple carrier payload.

As shown in FIG. 6A, the SC-only device does not need to implement an additional processing block to support multiple carrier packets. Any single carrier modulated packet is a "pure" single carrier packet that requires no additional processing. Multiple carrier packets are constructed with a single carrier modulated preamble and header, so the single carrier device can decode the header and know the duration/destination of the multiple carrier packet.

Referring to FIG. 6B, the MC-Only receiver 140 is configured to understand the single carrier common preamble/header. The MC-Only receiver 140 receives the single carrier common preamble/header via an antenna 142. The received single carrier common preamble/header is processed by a packet synchronizer/header decoder 144 that detects whether the payload portion that follows will be a single carrier signal or multiple carrier signal as well as several characteristics of the incoming payload signal. The packet synchronizer/header decoder 144 forwards these detected parameters to a multiple carrier demodulator 146. If the packet synchronizer/header decoder detects that the incoming payload portion of the packet is a single carrier signal, the payload is ignored as the multiple carrier demodulator 146 is not capable of processing the single carrier payload. However, if the common preamble/header identifies a multiple carrier payload, the multiple carrier demodulator 146 receives the payload via the antenna 142 as shown at 148, demodulates the payload, and passes the demodulated payload to the decoder 150, which decodes the data 152 and makes the data available to downstream circuitry. As shown in FIG. 6B, the MC-only receiver 140 requires only one additional, simple packet synchronization and header decoding receiver block for extracting all the physical layer information for multiple carrier demodulation/decoding.

Figure 7A:
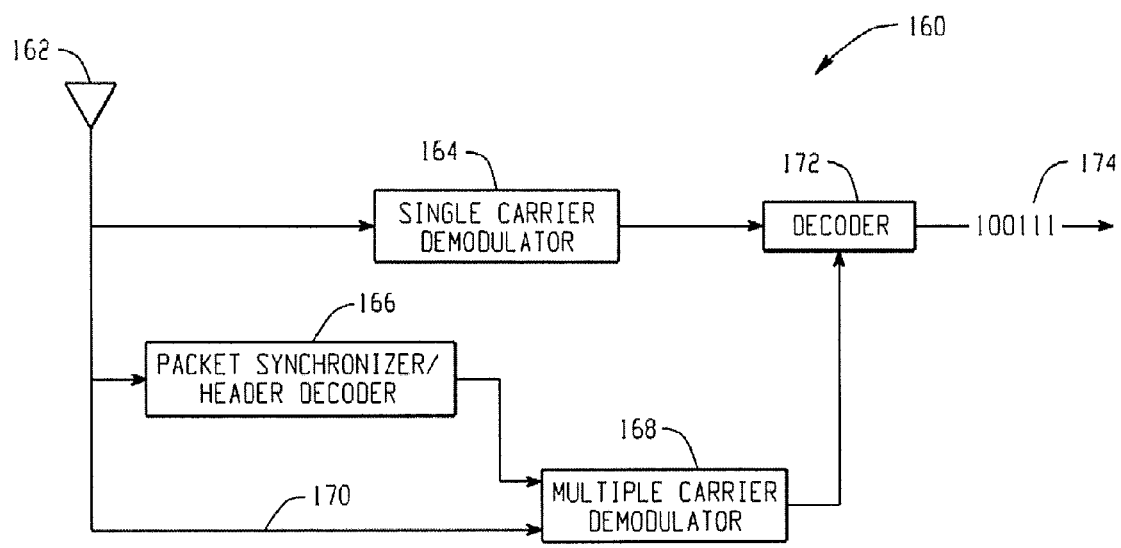
FIGS. 7A and 7B depict a dual mode receiver that includes a packet synchronizer/header decoder and a second dual mode receiver.
Figure 7B:
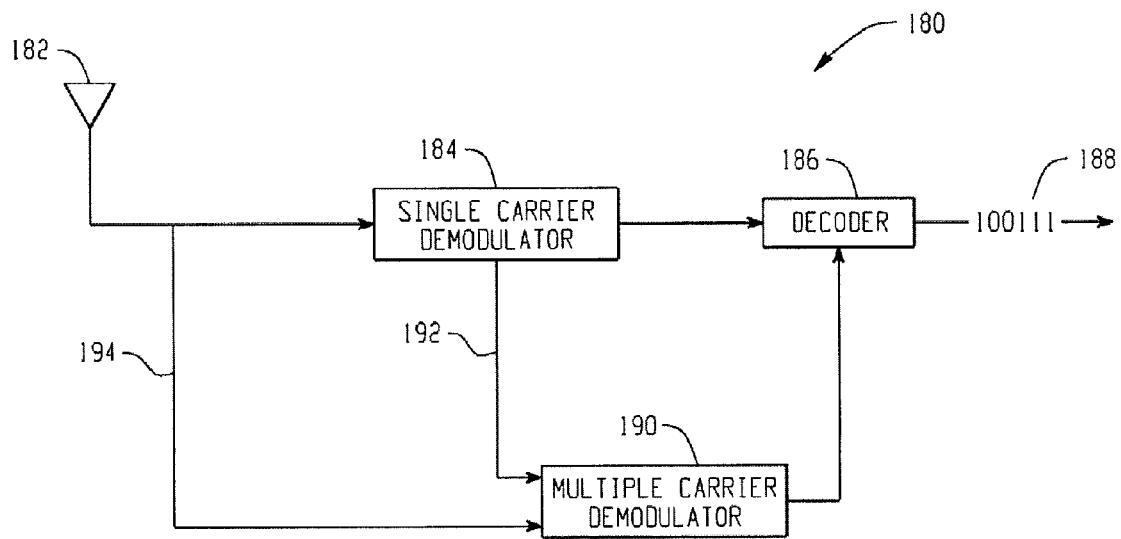

FIGS. 7A and 7B depict a dual mode receiver 160 that includes a packet synchronizer/header decoder and a second dual mode receiver 180. Both of the depicted receivers are capable of understanding the single carrier common preamble/header. The dual mode receiver 160 of FIG. 7A receives the single carrier common preamble/header via an antenna 162. The received preamble/header is propagated to a single carrier demodulator 164 and a packet synchronizer/header decoder 166. Both the single carrier demodulator 164 and the packet synchronizer/header decoder 166 process the received preamble/header to detect whether the following payload will arrive via a single carrier signal or a multiple carrier signal and to determine parameters of the signal and payload. If the incoming payload is a single carrier payload, the single carrier demodulator 164 extracts the payload from the single carrier signal and passes the payload to the decoder 172 which makes the decoded data 174 available to downstream circuitry. If the incoming payload is a multiple carrier payload, the packet synchronizer/header decoder 166 forwards parameters of the incoming signal and payload to the multiple carrier demodulator 168. The multiple carrier demodulator 168 receives the multiple carrier signal as shown at 176 and extracts the payload from the multiple carrier signal. The extracted payload is then propagated to the decoder 172 which makes decoded data 174 available to downstream circuitry.

Referring to FIG. 7B, the dual mode receiver 180 receives the single carrier common preamble/header via an antenna 182. The common preamble/header is processed by the single carrier demodulator 184 which detects whether the incoming payload portion of the packet is a single carrier signal or multiple carrier signal. If the incoming payload is a single carrier signal, the single carrier demodulator 184 extracts the payload and passes the payload data to a decoder 186 which makes the decoded data 188 available to downstream circuits. If the incoming payload is a multiple carrier signal, the single carrier demodulator alerts the multiple carrier demodulator 190 and passes along parameters of the incoming payload and signal as shown at 192. The multiple carrier demodulator 190 receives the incoming multiple carrier payload as shown at 194. The multiple carrier demodulator 190 extracts the payload from the multiple carrier signal and forwards the payload to the decoder 186 that makes the decoded data 188 available to downstream circuitry.

As illustrated above, the MC-Only and dual mode receivers require only a small amount of additional hardware to handle the modified packet format. The receivers may require two sets of sampling clocks that come from the same source clock. Alternatively, the receiver may sample using the multiple carrier higher clock rate all through the packet and apply digital interpolation for the lower clock rate segments. The receivers utilize the preamble information for determining carrier sense, frequency offset, timing reference, AGC/ADC setting, and single carrier channel impulse estimation (at least for demodulating the header).

Utilizing the above described or similar transmitters and receivers, coexistence between single carrier and multiple carrier hardware may be supported. Even if the modulation format of the incoming packet is not supported, an SC-Only or MC-Only device may delay its own transmissions by understanding the preamble/header to avoid collisions. Coexistence may be guaranteed by transmitting the single carrier common preamble/header at a low rate such that all devices in the network can understand.

Figure 8:
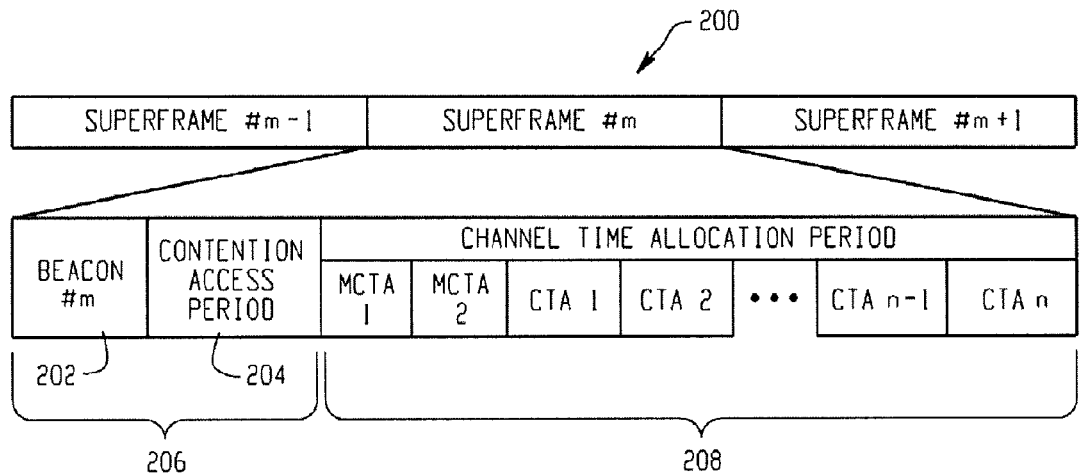
FIG. 8 depicts a superframe structure for IEEE 802.15.3c MAC.

FIG. 8 depicts a superframe structure 200 for IEEE 802.15.3c MAC. In this structure 200, the beacon portion 202 and the contention access period portion 204 make up the preamble/header portion 206 that is transmitted using a single carrier signal transmitted at a low common data rate. This preamble/header portion identifies whether the payload portion 208 transmitted during the channel time allocation period will be transmitted via a single carrier signal or multiple carrier signal as well as parameters of the coming payload and signal such as the physical layer demodulation/decoding information of the payload portion. A receiver determines the characteristics of the incoming payload portion 208 of the signal and properties of the incoming signal to prepare for receipt and demodulation of the signal.

Figure 9:
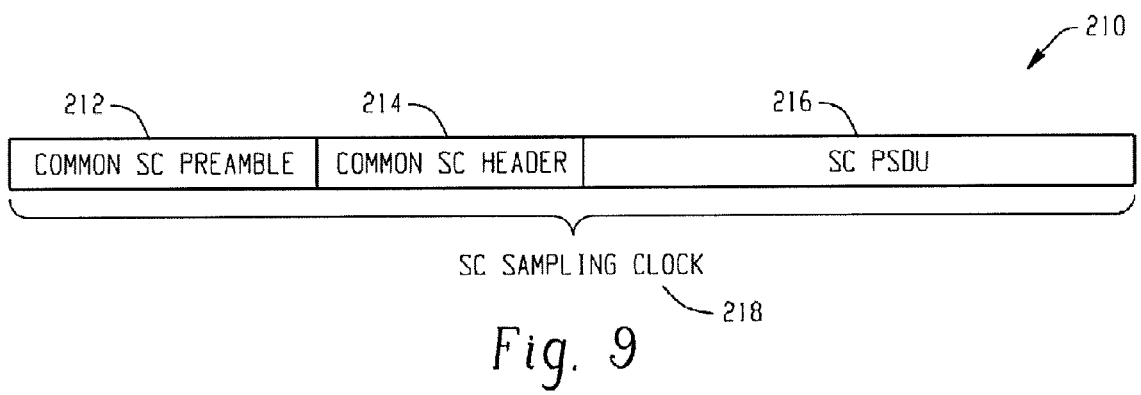
FIG. 9 depicts a single carrier modulated packet.
Figure 10:
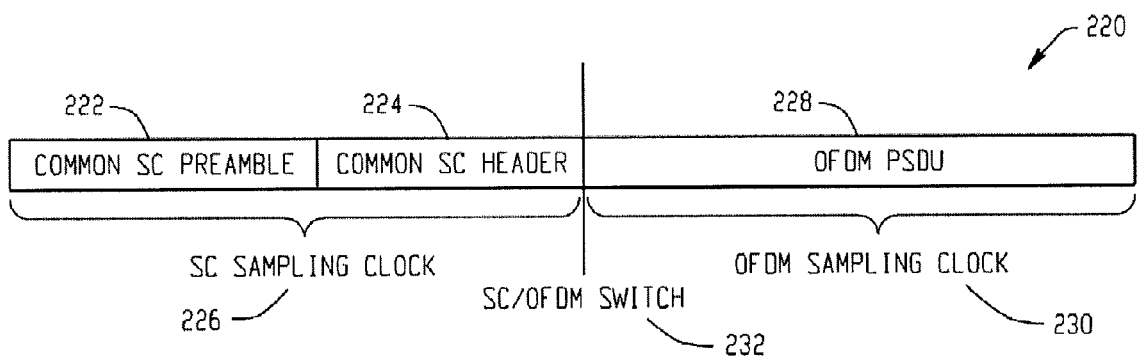
FIG. 10 depicts an OFDM multiple carrier modulated packet.
Figure 11:
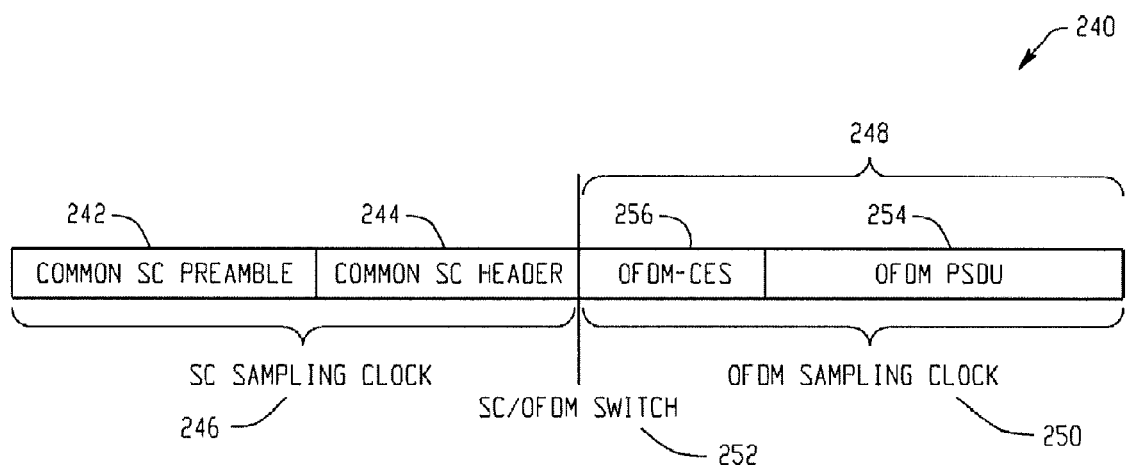
FIG. 11 depicts an OFDM multiple carrier modulated packet that includes an OFDM channel estimation sequence.

FIGS. 9-11 depict example frames that contain common single carrier preambles/headers. FIG. 9 depicts a single carrier modulated packet 210. The single carrier modulated packet 210 begins with a common single carrier preamble 212 followed by a common single carrier header 214. The single carrier preamble/header portions 212, 214 are followed by a single carrier physical service data unit (PSDU) 216 that may also be referred to as a single carrier payload portion 216. As illustrated at 218, the entire single carrier modulated packet 210 may be sampled at the receiver by the same single carrier sampling clock.

FIG. 10 depicts an OFDM multiple carrier modulated packet 220 that includes a single carrier preamble/header portion. The packet begins with a common SC preamble 222 and a common single carrier header 224. The common single carrier preamble/header portions 222, 224 may be sampled by the single carrier sampling clock as indicated at 226. The common single carrier preamble/header portions 222, 224 are followed by an OFDM PSDU payload portion 228. This multiple carrier payload portion 228 may be sampled by a higher rate OFDM sampling clock as indicated at 230. This change in sampling rate from the slower single carrier sampling clock 226 to the OFDM sampling clock 230 introduces a clock switch 232 which may be addressed as will be discussed herein below.

FIG. 11 depicts an OFDM multiple carrier modulated packet 240 that includes an OFDM channel estimation sequence. The packet begins with a common single carrier preamble 242 and a common single carrier header 244. The common single carrier preamble/header portions 242, 244 may be sampled by the single carrier sampling clock as indicated at 246. The common single carrier preamble/header portions 242, 244 are followed by an OFDM payload portion 248. The OFDM payload portion 248 may be sampled by a higher rate OFDM sampling clock as indicated at 250. This change in sampling rate from the slower single carrier sampling clock 246 to the OFDM sampling clock 250 introduces a clock switch 252 as was described with reference to FIG. 10. The payload portion 248 of the OFDM packet 240 includes the PSDU data portion 254 as well as an OFDM channel estimation sequence (CES) portion 256. The CES portion 256 enables an OFDM demodulator to further calibrate for the incoming data portion 254 of the packet as will be described further herein below.

Figure 1:
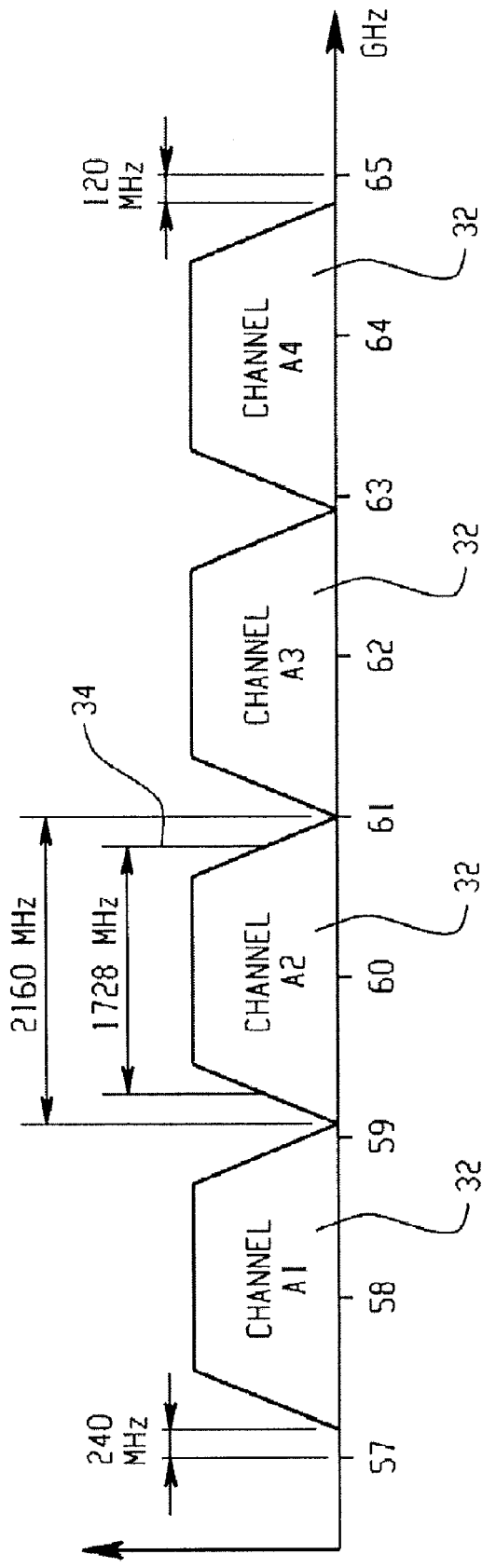
FIG. 1 depicts an example 60 GHz frequency channel plan.

As noted with reference to FIGS. 10 and 11, the single carrier and multiple carrier portions of a packet may be sampled at different rates to take advantage of benefits and limitations of the different modulation schemes. To avoid out-of-band emission and to fulfill the channel plan (e.g., as shown in the 60 GHz 802.15.3c plan depicted in FIG. 1), single carrier signals may be transmitted with a sampling clock rate (bandwidth) lower than the overall bandwidth of the assigned bandwidth. This is shown in FIG. 1 at 34 where the single carrier baseband signal is sampled using a clock of 1.728 GHz. Advanced baseband/analog pulse shape filtering may also be applied on the SC modulated baseband signal to further reduce out-of-band emissions and to maintain the spectrum mask defined by the wireless standard.

In contrast, multiple carrier signals, such as OFDM, may be transmitted using a higher bandwidth and guard subcarriers (null tones) at the edges of the inband tones to limit out-of-band emission and maintain the spectrum mask. For example, the OFDM baseband signal may be sampled using a clock rate of 2.592 GHz, which is 1.5 times the single carrier sampling rate. In an OFDM signal, pulse shape filtering is easier to realize due to low subcarrier bandwidth and the presence of guard subcarriers. This pulse shape filtering may be accomplished using time domain tapering equivalent to frequency domain convolution, or time domain convolution maybe used.

Figure 12:
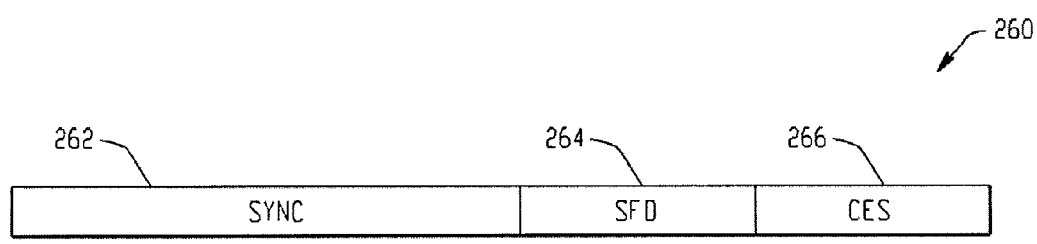
FIG. 12 depicts a common single carrier preamble.

FIG. 12 depicts a common single carrier preamble portion 260. The common single carrier preamble portion 260 begins with a signaling portion 262 followed by a frame delimiter sequence (SFD) 264. A signaling portion may include a synchronization portion, a channel estimation portion, and/or a header portion. The frame delimiter sequence 264 may be followed by a single carrier channel estimation sequence 266.

The synchronization subfield 262 contains signals for synchronizing a receiver with an incoming packet. The synchronization subfield 262 may contain spreading sequences, such as a Golay sequence of length 128, having pi/2 BPSK modulation (or any other modulation that spreads energy equally in real and imaginary parts of the baseband signal) that are concatenated repeatedly to help achieve synchronization. The signaling portion 262 may additionally or alternatively contain cover sequences that are spread using a spreading sequence. Different cover sequences may be used for signaling a receiver about various parameters such as a piconet ID or header rate. Different cover sequences may also be used to signal the receiver as to whether single carrier modulation or multiple carrier modulation will be applied to the data payload. If this data is included in the signaling portion 262, then the receiver may discover the single carrier/multiple carrier mode at the very beginning of the packet, so that the receiver may set receiving physical layer parameters, such as ADC headroom, ADC precision, AGC gain targets, specific for receiving single carrier data or multiple carrier data. Similarly, different spreading sequences may be used to signal the receiver whether single carrier modulation or multiple carrier modulation will be applied to modulate the data payload (e.g., the use of different or a pair of complementary Golay sequences identifies the format of the data payload portion). Additionally, carrier sensing, carrier frequency offset, AGC/ADC setting, and timing reference may be determined based on the synchronization subfield. Similarly, different cover sequences in the SFD portion of the preamble or different spreading sequences in the CES portion of the preamble may be used to signal the receiver as to whether single carrier modulation or multiple carrier modulation will be applied to modulate the data payload.

The frame delimiter sequence 264 is a sequence that establishes frame timing such as the Golay sequence using pi/2 BPSK as in the 802.15.3c draft standard 2.0. The channel estimation sequence 266 is a sequence known to the receiver for single carrier and/or multiple carrier channel estimation such as long complementary Golay sequences with pi/2 BPSK as in the 802.15.3c draft standard 2.0.

Figure 13:
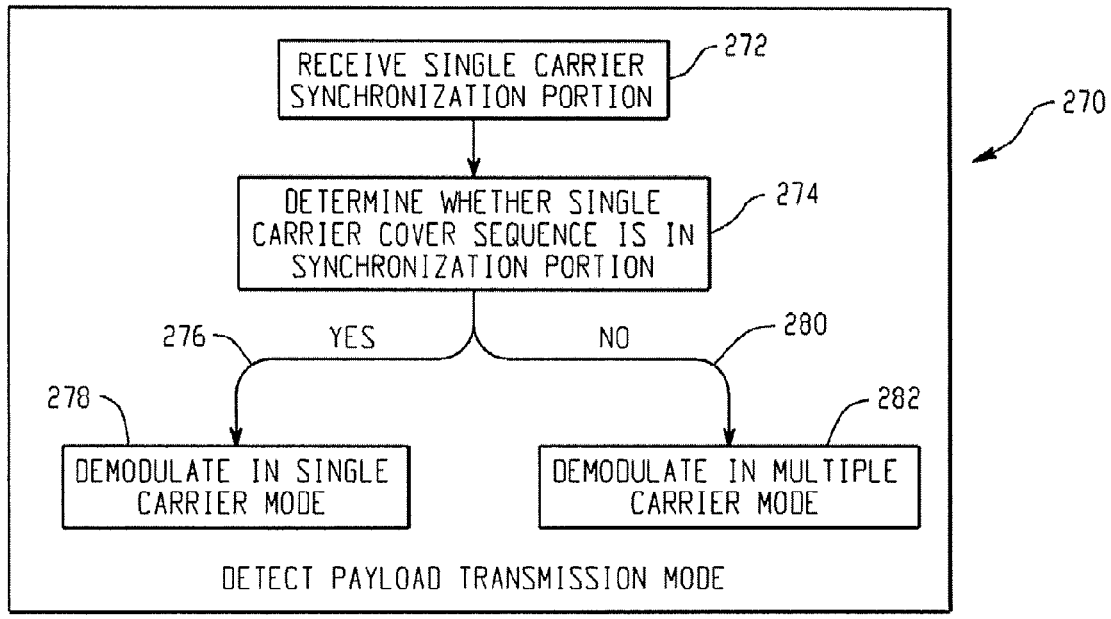
FIG. 13 is a flow diagram depicting detection of a payload transmission mode based on a carrier cover sequence.

FIG. 13 is a flow diagram depicting detection of a payload transmission mode based on a single carrier cover sequence. A dual mode receiver receives a single carrier signaling portion of a packet as shown at 272. A determination is made at 274 as to whether a single carrier cover sequence is present within the signaling portion that identifies that the following data payload portion will be a single carrier signal. If the single carrier data payload cover sequence is in the single carrier signaling portion, the yes branch 276 is taken and the payload portion is demodulated and decoded in a single carrier mode as shown at 278. If the single carrier data payload cover sequence is not in the single carrier signaling portion, then the incoming data payload will be a multiple carrier signal and the no branch 280 is taken. The payload portion is then demodulated and decoded in a multiple carrier mode as shown at 282. Alternatively, the presence of different cover sequences in the SFD portion may be utilized to detect single carrier or multiple carrier payload portion transmission.

Figure 14:
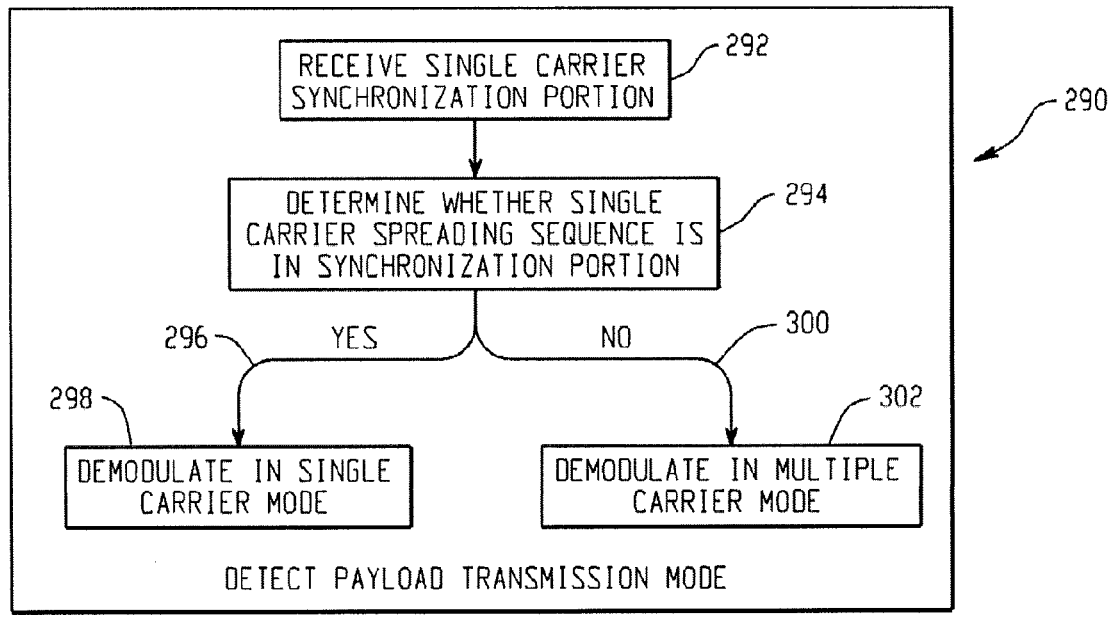
FIG. 14 is a flow diagram depicting detection of a payload transmission mode based on a carrier spreading sequence.

FIG. 14 is a flow diagram depicting detection of a payload transmission mode based on a carrier spreading sequence. A dual mode receiver receives a single carrier signaling portion of a packet as shown at 292. A determination is made at 294 as to whether a single carrier spreading sequence is present within the signaling portion that identifies that the following data payload portion will be a single carrier signal. If the single carrier data payload spreading sequence is in the single carrier signaling portion, the yes branch 296 is taken and the payload portion is demodulated and decoded in a single carrier mode as shown at 298. If the single carrier data payload spreading sequence is not in the single carrier signaling portion, then the incoming data payload will be a multiple carrier signal and the no branch 300 is taken. The payload portion is then demodulated and decoded in a multiple carrier mode as shown at 302. Alternatively, different spreading sequences in the CES portion may be utilized for signaling single carrier or multiple carrier payload portion transmission.

Figure 15:
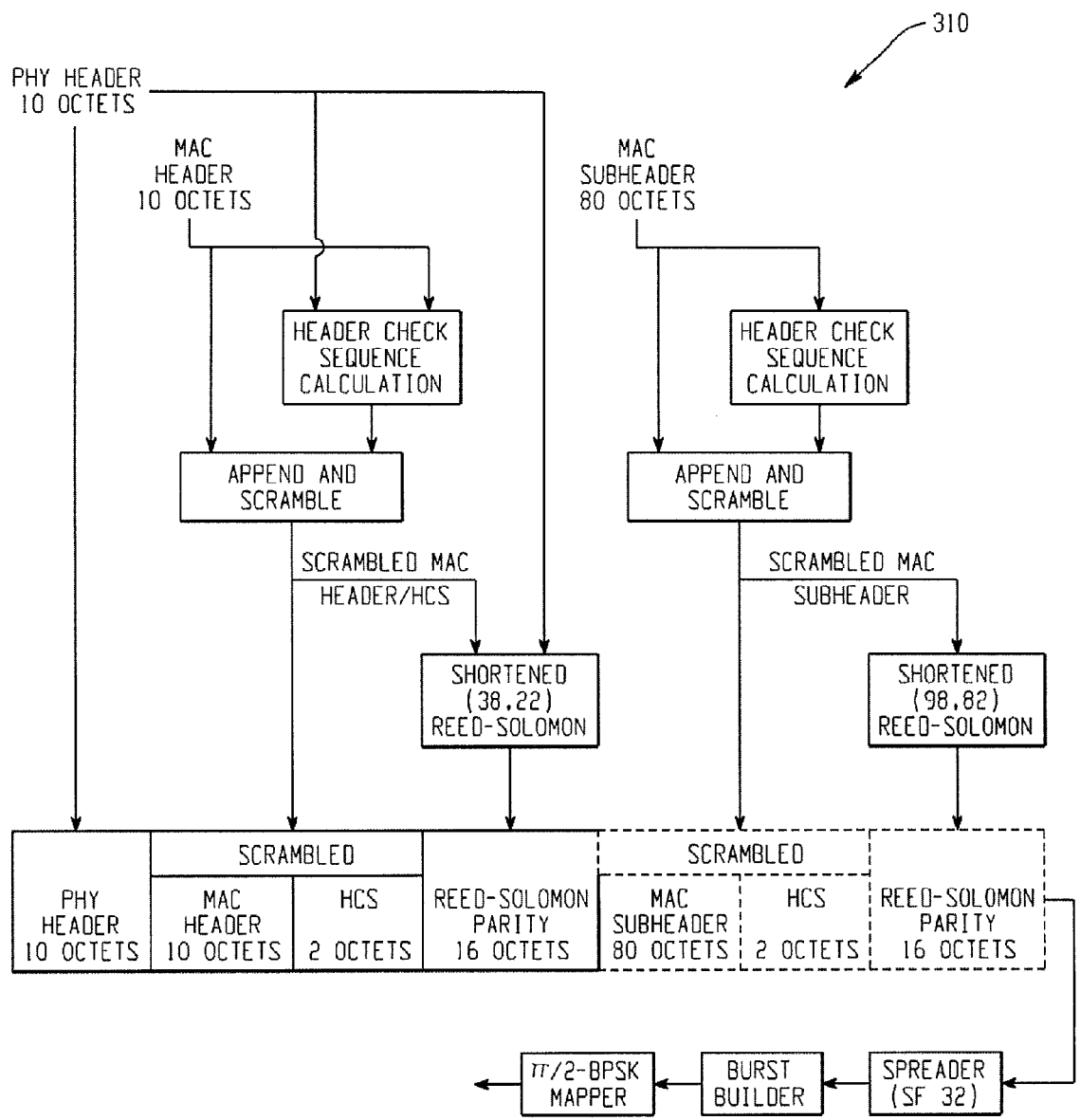
FIG. 15 depicts a common single carrier header.

FIG. 15 depicts an example common single carrier header 310. The single carrier modulated header contains all of the necessary physical layer demodulation/decoding information, such as packet length, pilot insertion information, cyclic prefixes, for both single carrier packets and multiple carrier packets and may contain the MAC layer header. The receiver may obtain MAC header information even if the MAC content in the payload portion is not decodable, due to an unsupported mode, because all receivers are able to interpret the single carrier header portion. To increase reliability of header decoding, the common single carrier header 310 may be transmitted at a low data rate. The header illustrated in FIG. 15 is in compliance with the 802.15.3c draft 2.0 standard.

As noted with reference to FIGS. 10 and 11, a multiple carrier payload packet that begins with a single carrier preamble/header portion may include a jump in sampling frequency between the single carrier portion and multiple carrier portion. This jump may require some compensation at the transmitters and/or receivers to coherently demodulate and decode the payload portions.

A first compensation that may be required is compensation to maintain coherence in carrier frequency at the switch. To accomplish coherence in the carrier frequency, the transmitter uses the same carrier frequency across a multiple carrier payload packet's single carrier and multiple carrier segments. The same source baseband clock is applied across the two segments at the transmitter, where a lower sampling rate for generating the single carrier portion of the baseband signal may be realized through interpolation.

Another compensation that may be required is compensation to maintain coherence in carrier phase at the switch. Spectrum mask/out-of-band transmissions may be controlled for the single carrier and multiple carrier segments of a multiple carrier payload packet through the use of pulse shaping filters. The phase change at the SC/MC switch point may cause a large out-of-band emission if the phase difference between the last symbol of the single carrier header and the first sample of the multiple carrier payload portion is large.

Figure 16:
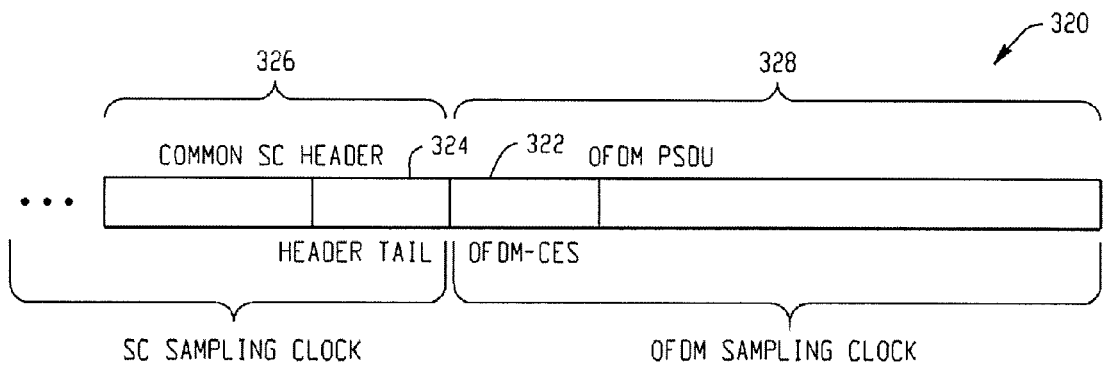
FIG. 16 depicts an OFDM multiple carrier modulated packet that includes an OFDM channel estimation sequence and a header tail in the common single carrier header.

One solution is to multiply the whole multiple carrier segment by the phasor of the last symbol of the single carrier header or by a phasor with a phase close to the phase of the header's last symbol. For example, if the header is modulated using pi/2 BPSK and the number of symbols in the header is a multiple of 4, then the last symbol is +/−j. Thus, compensation may be achieved by multiplying the multiple carrier segment by j if the last symbol is j or by −j if the last symbol is −j A second solution is depicted in FIG. 16. FIG. 16 depicts a portion of an OFDM MC modulated packet 320 that includes an OFDM channel estimation sequence 322 and a header tail 324 in the common single carrier header 326. The single carrier header portion 326 includes a tail subfield at the end of the header (e.g., 4 ones with pi/2 BPSK modulation, so that the last symbol is −j). The OFDM MC payload portion 328 of the packet 32 then includes a multiple carrier CES symbol 322 at the beginning of payload portion (e.g., the OFDM-CES subfield that may be used for OFDM channel estimation refinement). The out-of-band emissions may be minimized by designating the last symbol of the header tail 324 such that it contains a small phase shift to the first OFDM-CES symbol. The small phase shift between the selected final header tail 324 symbol and the known beginning of the OFDM-CES enables elimination of the spurious out-of-band emissions caused by larger phase shifts at the boundary.

Another compensation that may need to be implemented for successful transition from the single carrier to multiple carrier portions of a single carrier payload packet having a single carrier preamble/header is compensation to maintain coherence in power at the switch. The single carrier and multiple carrier segments may need to be transmitted with the same power. To compensation for this coherence of power across the single carrier segment and multiple carrier segments, the receiver AGC may be appropriately set based upon parameters determined from the signaling portion of the common single carrier preamble.

The jump from single carrier sampling to multiple carrier sampling may also require compensation to ensure coherence in timing. For example, in the case of 802.15.3c, OFDM is sampled at 1.5 times the rate of SC. In other words, the time duration for two clock cycles of the single carrier portion is the same time as the duration for 3 clock cycles of the OFDM portion. In the example of 802.15.3c, to help ensure a successful change from single carrier to OFDM, the time alignment should be guaranteed at each 2 cycle boundary of the single carrier clock. Interpolation may be used for converting the clock rates from the same source clock.

Figure 17:
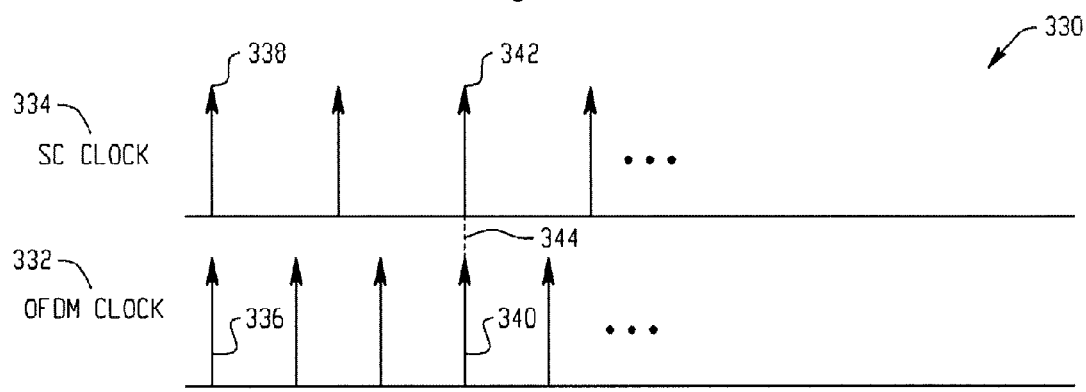
FIG. 17 depicts sample timing where the OFDM clock samples at 1.5 times as fast as a single carrier clock.

FIG. 17 depicts sample timing where the OFDM clock 332 samples at 1.5 times as fast as a single carrier clock 334. The clocks are aligned such that a first pulse 336 of the OFDM clock 332 is aligned with a first pulse 338 of the single carrier clock 334, and a fourth pulse 340 of the OFDM clock 332 is aligned with a third pulse 342 of the single carrier clock 334 as shown at 344.

Figure 18:
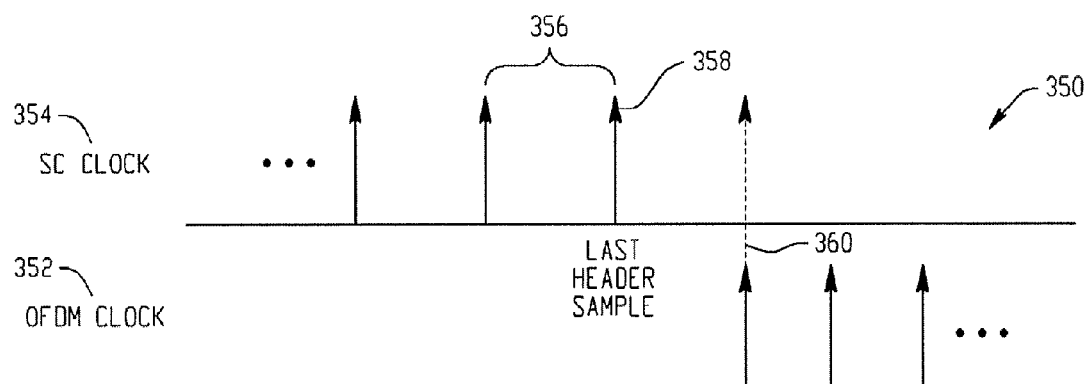
FIG. 18 depicts sample timing where the OFDM clock samples at 2 times as fast as a single carrier clock.

FIG. 18 depicts sample timing where the OFDM clock 352 samples at 2 times as fast as a single carrier clock 354. In the example of FIG. 18, the OFDM clock 352 begins one single carrier pulse width 356 after the last single carrier header sample 358 as shown at 360. Alternatively, the OFDM clock could run continuously in a similar fashion as shown in FIG. 17, where a first OFDM pulse would align with a first single carrier pulse and a third OFDM pulse would align with a second single carrier pulse.

As described above, in a single carrier packet containing a single carrier preamble/header portion, the receiver may rely on a CES in the single carrier portions as described with reference to FIG. 12, or the MC portion of the packet may contain an SC-CES sub-portion as described with respect to FIG. 11. In the case where the receiver uses the information of the SC-CES portion to perform both single carrier and MC channel estimation for both single carrier preamble/header and MC payload demodulation, a coherent spectrum may be kept across the switch from single carrier to multiple carrier.

The SC-CES usually derives a channel impulse response with high accuracy due to the processing gain sampled at the single carrier sampling rate. Using the SC-CES, multiple carrier frequency domain (per-sub-carrier) channel estimation may be obtained by over-sampling the estimated channel response to the multiple carrier clock rate and performing a fast-Fourier transform (FFT) on the detected samples. The FFT may be applied directly on the time-domain channel estimate, and the resultant frequency domain channel estimate may be downsampled (e.g., to 352 (336+16) tones). To utilize the SC-CES for multiple carrier channel estimation, the frequency response for single carrier and multiple carrier may need to be near identical to guarantee the quality of the multiple carrier channel estimate.

An equivalent channel is the combination of the over-the-air channel, analog filters at the transmitter and receiver, and digital (pulse shaping) filters at the transmitter and receiver. The over-the-air channel and analog filters at the transmitter and receiver are often common between the single carrier and multiple carrier segments. However, the digital filters may be different based on design requirements of the single carrier and multiple carrier segments.

Figure 19:
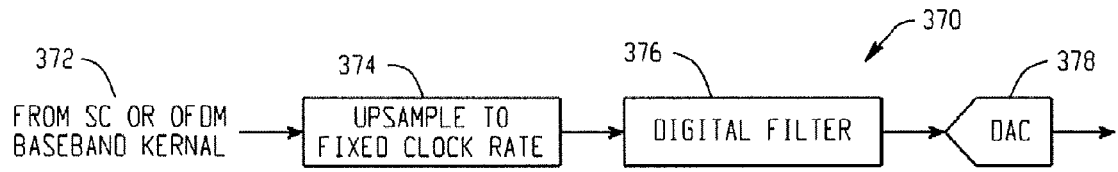
FIG. 19 depicts a transmitter configuration for maintaining a coherent spectrum between a single carrier portion and a multiple carrier portion of a received signal.

A first mechanism for maintaining a coherent spectrum across the single carrier and multiple carrier portions of a packet is to have the single carrier and multiple carrier segments utilize the same digital filter at the transmitter using the same sampling rate. FIG. 19 depicts a transmitter configuration for maintaining a coherent spectrum between a single carrier portion and an OFDM or other multiple carrier portion of a received signal. To accomplish this, both segments 372 may be upsampled to the same rate, as shown at 374, and then the same digital filter is applied 376 before entering a digital-to-analog converter (DAC) 378.

A second mechanism is to predetermine and fix digital pulse shaping filters for the single carrier and multiple carrier segments such that their frequency responses (amplitude and phase) on different subcarriers are known by both the transmitter and receiver. While filter amplitudes are often flat over the data subcarriers, this second mechanism may limit implementation flexibility.

Figure 20:
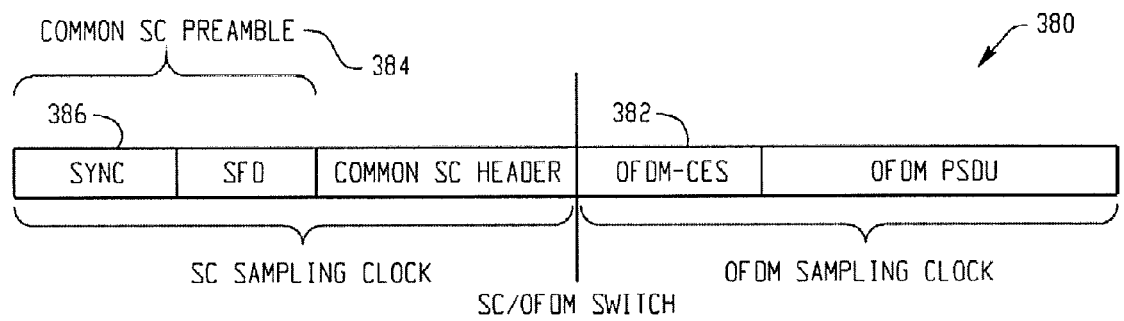
FIG. 20 depicts an OFDM multiple carrier modulated packet that includes an OFDM channel estimation sequence that does not include a single carrier channel estimation sequence.

In addition to using the SC-CES to perform channel estimation for the multiple carrier portion of the packet, the multiple carrier portion of the packet may contain its own MC-CES. In cases where channel estimation is performed using an MC-CES, compensation to maintain a coherent spectrum as described above is not necessary. In addition, if an MC-CES is utilized and the packet is a multiple carrier payload packet, transmission of the SC-CES may not be necessary. FIG. 20 depicts an OFDM multiple carrier modulated packet 380 that includes an OFDM channel estimation sequence 382 that does not include a single carrier channel estimation sequence. This is shown at 384 where the common single carrier preamble does not contain a CES sub-portion. This can be contrasted with the example common single carrier preamble described with reference to FIG. 12 above.

The SC-CES may still need to be applied for packets having a single carrier payload. The receiver may be configured to be able to tell whether a single carrier payload is forthcoming, and thus whether an SC-CES is coming, based on the signaling portion 386 of the common single carrier preamble 384. If the SC-CES is not transmitted, the receiver may use the signaling portion 386 of the common single carrier preamble 384 to determine single carrier channel estimation (e.g., by adaptive training as in 802.11b), so that the header can still be correctly decoded. Because the header may be spread using a high spreading factor, it may be robust against channel estimation inaccuracies that might be caused by removing the SC-CES.

As an additional example, the SC-CES and an MC-CES may be transmitted in a multiple carrier payload packet. A first channel estimate may be calculated for the entire packet based on the SC-CES sub-portion. A second channel estimate may also be calculated based on the received MC-CES sub-portion of the multiple carrier payload portion. Both of these first and second channel estimates may be utilized to generate a final channel estimate that is used in processing the multiple carrier payload portion.

Figure 21:
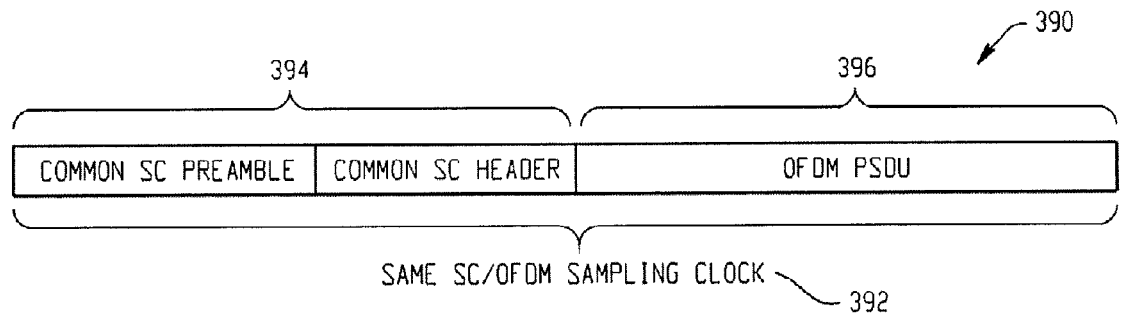
FIG. 21 depicts an OFDM multiple carrier modulated packet that is sampled at the same rate throughout the single carrier and multiple carrier portions.

FIG. 21 depicts an additional example where an OFDM multiple carrier packet 390 is sampled at the same rate 392 throughout the SC 394 and MC 396 portions. In this example, the SC 394 and MC 396 portions of the packet utilize the same sampling rate throughout. Both portions may fulfill the spectrum mask defined by the regulation authority through appropriate digital and analog filtering. In this case no sampling rate switching is required between the SC and OFDM portions. The non-appearance of the sampling rate jump between the single carrier portion and OFDM portion of the packet mitigates the need for several of the compensations described above. Additionally, if the same digital filter is applied throughout the transmitted packet at the transmitter, the SC-CES may be used for channel estimation throughout the entire packet. Thus, the OFDM-CES may not be needed, further improving physical layer efficiency. As an alternative, an OFDM-CES may be used without use of an SC-CES. As a further alternative, both an SC-CES and OFDM-CES may be used to gain reliability.

Figure 22A:
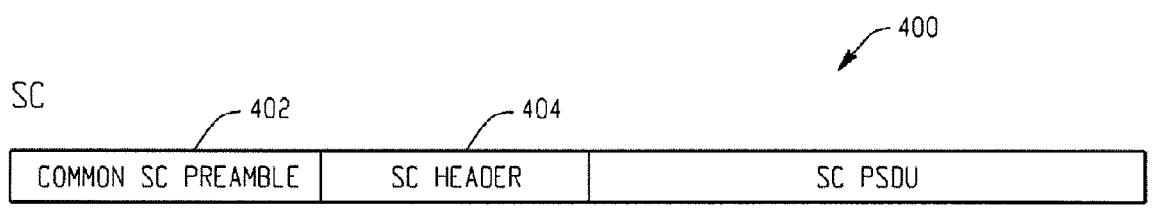
FIGS. 22A and 22B depict a single carrier modulated packet that includes a single carrier header and an OFDM multiple carrier modulated packet that includes an OFDM header that contains an OFDM channel estimation sequence.
Figure 22B:
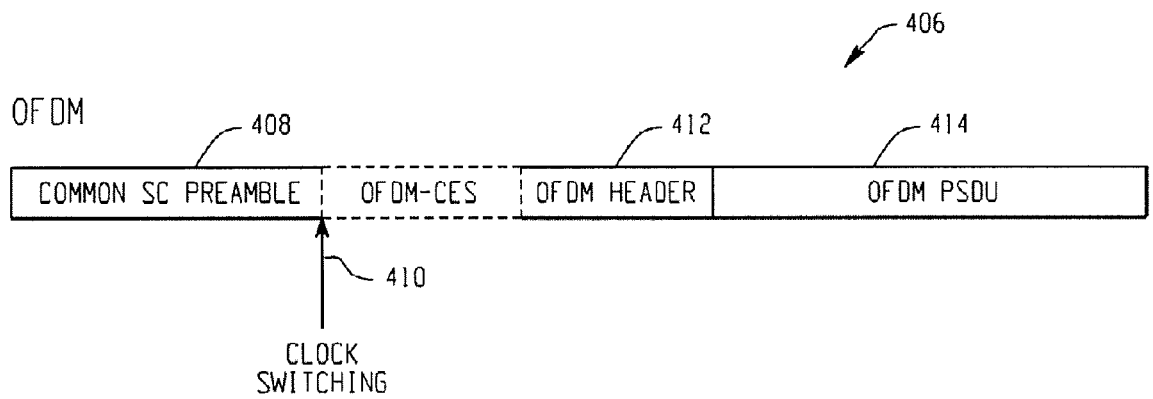

FIGS. 22A and 22B depict a further example. FIG. 22A depicts a single carrier modulated packet 400 that includes a single carrier header. FIG. 22B depicts an OFDM multiple carrier modulated packet 406 that includes an OFDM header that contains an OFDM channel estimation sequence. As shown in FIG. 22A, the single carrier payload packet 400 includes a common single carrier preamble segment 402 and a single carrier header portion 404. In this example, a single carrier payload packet is of a similar form as described above. A variation is shown, however, in the multiple carrier payload packet 406 shown in FIG. 22B. The OFDM multiple carrier modulated packet 406 of FIG. 22B contains a common single carrier preamble portion 408 similar to the one shown in FIG. 22A. However, the OFDM payload packet of FIG. 22B does not include a header portion of the packet in the single carrier portion of the frame. Instead, the clock switching occurs immediately following the single carrier preamble portion 408, as illustrated at 410. An OFDM-CES sub-portion is transmitted followed by an OFDM header portion 412, which is transmitted during the OFDM portion of the OFDM payload packet 406. The OFDM header 412 is then followed by the OFDM payload portion.

Figure 23:
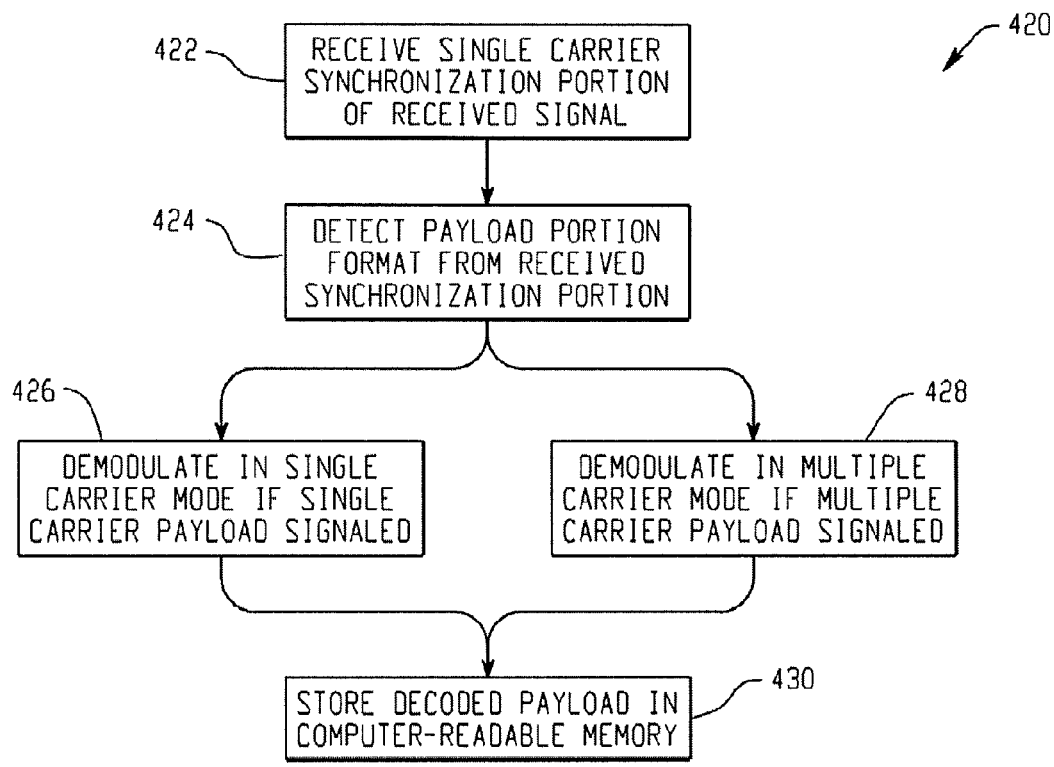
FIG. 23 is a flow diagram for decoding a single carrier mode signal or a multiple carrier mode signal based on a received signaling portion of a received signal.

FIG. 23 is a flow diagram for decoding a single carrier mode signal or a multiple carrier mode signal based on a received signaling portion of a received signal. A single carrier signaling portion of the received signal is received as shown at 422. From the received signaling portion, whether the payload portion of the received signal will be a single carrier signal or a multiple carrier signal is detected 424. If a single carrier payload is signaled by the signaling portion, then the payload portion of the signal is demodulated and decoded in a single carrier mode 426. In contrast, if a multiple carrier payload is signaled by the received signaling portion, then the payload portion is demodulated and decoded in a multiple carrier mode as shown at 428. The decoded payload is then stored in a computer readable memory 430.

Figure 24:
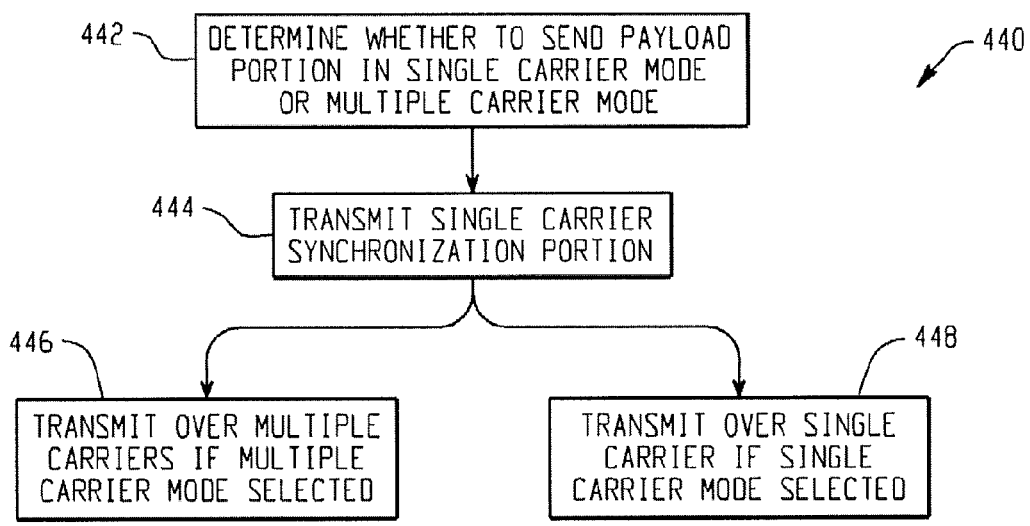
FIG. 24 is a flow diagram for a method for transmitting a single carrier payload or a multiple carrier payload following transmission of a single carrier signaling portion of a signal.

FIG. 24 is a flow diagram for a method for transmitting a single carrier payload or a multiple carrier payload following transmission of a single carrier signaling portion of a signal. A determination is made whether to send a payload portion of a signal in a single carrier mode or a multiple carrier mode 442. The transmitter transmits an appropriate single carrier signaling portion of the signal as shown at 444. The signaling portion may identify whether the following payload portion is a single carrier or multiple carrier payload. If the determination is made to send a multiple carrier payload, then the payload is transmitted over multiple carriers as shown at 446. In contrast, if a single carrier payload is to be sent, then the payload is transmitted over a single carrier as illustrated at 448.

Figure 25:
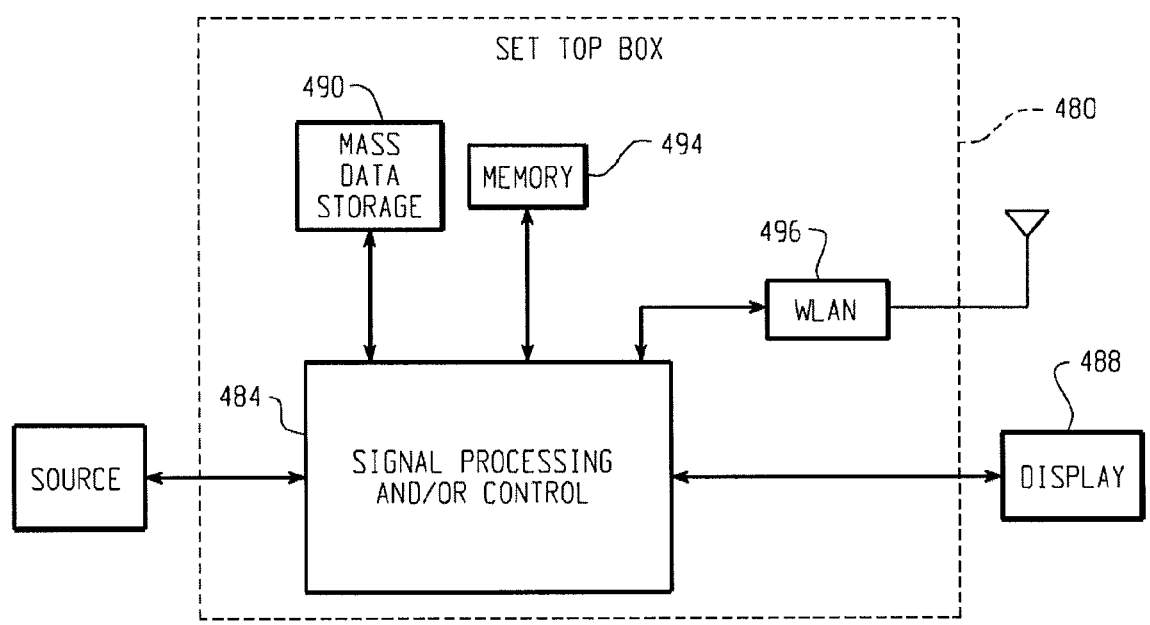
FIG. 25 illustrates an exemplary implementation of the present invention.

The above described concepts may be implemented in a wide variety of applications including those examples described herein below. Referring to FIG. 25, the present invention may be embodied in a device 480. The device can be a device that receives wireless signals—e.g., a storage device, a computer system, a smart phone, a set top box, a cellular phone, a personal digital assistant (PDA), a vehicle, and so on. The present invention may implemented within signal processing and/or control circuits, which are generally identified in FIG. 25 at 484, a WLAN interface and/or mass data storage of the device 480. In one implementation, the device 480 receives signals from a source and outputs signals suitable for a display 488 such as a television and/or monitor and/or other video and/or audio output devices. Signal processing and/or control circuits 484 and/or other circuits (not shown) of the device 480 may process data, perform coding and/or encryption, perform calculations, format data and/or perform any other function as required by a particular application.

The device 480 may communicate with mass data storage 490 that stores data in a nonvolatile manner. Mass data storage 490 may comprise optical and/or magnetic storage devices for example hard disk drives HDD and/or DVDs. The device 480 may be connected to memory 494 such as RAM, ROM, low latency nonvolatile memory such as flash memory and/or other suitable electronic data storage. The device 480 also may support connections with a WLAN via a WLAN network interface 496.

This written description uses examples to disclose the invention, including the best mode, and also to enable a person skilled in the art to make and use the invention. It should be noted that the systems and methods described herein may be equally applicable to other frequency modulation encoding schemes. The patentable scope of the invention may include other examples that occur to those skilled in the art.

It is claimed:

1. A processor-implemented method of processing a received signal including a payload portion and a preamble portion, the preamble portion of the received signal being a single carrier signal, the payload portion of the received signal being a single carrier signal or a multiple carrier signal, the method comprising:
   receiving the preamble portion of the received signal, wherein the preamble portion of the received signal includes a channel estimation sequence;
   detecting from the channel estimation sequence in the preamble portion of the received signal whether the payload portion of the received signal is a single carrier signal or a multiple carrier signal, wherein
      (i) a first spreading sequence included in the channel estimation sequence indicates that the payload portion of the received signal is a single carrier signal, and
      (ii) a second spreading sequence included in the channel estimation sequence indicates that the payload portion of the received signal is a multiple carrier signal;
   in response to the payload portion of the received signal being a single carrier signal, demodulating the payload portion of the received signal in a single carrier mode;
   in response to the payload portion of the received signal being a multiple carrier signal, demodulating the payload portion of the received signal in a multiple carrier mode; and
   storing data from the demodulated payload portion of the received signal in a computer-readable memory.

2. The method of claim 1, further comprising performing channel estimation for both the single carrier mode and the multiple carrier mode based on the channel estimation sequence included in the preamble portion of the received signal.

3. The method of claim 2, wherein channel estimation for the multiple carrier mode is performed by sampling the channel estimation sequence at a multiple channel mode sampling rate and performing a fast-Fourier transform on detected samples.

4. The method of claim 1, wherein the payload portion of the received signal begins with a multiple carrier channel estimation sequence;
   wherein demodulating the payload portion of the received signal in a multiple carrier mode includes performing channel estimation for the multiple carrier mode based on the multiple carrier channel estimation sequence.

5. The method of claim 1, wherein detecting from the preamble portion of the received signal whether the payload portion of the received signal is a single carrier signal or a multiple carrier signal comprises:
   sampling, at a first rate, the preamble portion of the received signal, wherein the first rate is derived from a baseband clock,
   wherein demodulating the payload portion of the received signal in a multiple carrier mode further includes sampling, at a second rate, the payload portion of the received signal, wherein the second rate derived from the baseband clock,
   wherein the preamble portion of the received signal and the payload portion of the received signal contain the same carrier frequency.

6. The method of claim 5, wherein the first rate and the second rate are the same.

7. The method of claim 1, wherein demodulating the payload portion of the received signal in a multiple carrier mode further includes receiving the payload portion of the received signal, wherein the payload portion of the received signal has been transmitted with the same power as the preamble portion of the received signal.

8. The method of claim 1, wherein the multiple carrier signal is an OFDM signal.

9. The method of claim 1, wherein the received signal complies with a standard selected from the group consisting of: 802.15.3c; 802.11g; and 802.11n.

10. The method of claim 1, wherein the first and second spreading sequences are each different ones of a pair of complementary Golay sequences.

11. A system for processing a received signal including a payload portion and a preamble portion, the preamble portion of the received signal being a single carrier signal, the payload portion of the received signal being a single carrier signal or a multiple carrier signal, the system comprising:
   a signaling portion analyzer configured to (i) receive the preamble portion of the received signal, and (ii) detect from the preamble portion of the received signal whether the payload portion of the received signal is a single carrier signal or a multiple carrier signal, wherein the preamble portion of the received signal includes a channel estimation sequence, and wherein
      (i) a first spreading sequence included in the channel estimation sequence indicates to the signaling portion analyzer that the payload portion of the received signal is a single carrier signal, and
      (ii) a second spreading sequence included in the channel estimation sequence indicates to the signaling portion analyzer that the payload portion of the received signal is a multiple carrier signal;
   a demodulator configured to demodulate the payload portion of the received signal in a single carrier mode in response to the payload portion of the received signal being a single carrier signal, the demodulator further configured to demodulate the payload portion of the received signal in a multiple carrier mode in response to the payload portion of the received signal being a multiple carrier signal; and
   a computer-readable memory configured to store data from the demodulated payload portion of the received signal.

12. The system of claim 11, wherein the first and second spreading sequences are each different ones of a pair of complementary Golay sequences.

* * * * *